US008824268B2

(12) United States Patent
Chen (10) Patent No.: US 8,824,268 B2
(45) Date of Patent: Sep. 2, 2014

(54) METHOD AND APPARATUS FOR TRANSMITTING AN IMAGE IN A WIRELESS NETWORK (75) Inventor: Jian Feng Chen, Beijing (CN)

(73) Assignee: Thomson Licensing

( * ) Notice: Subject to any disclaimer, the term of this patent is extended or adjusted under 35 U.S.C. 154(b) by 411 days.

(21) Appl. No.: 12/735,640

(22) PCT Filed: Mar. 6, 2009

(86) PCT No.: PCT/IB2009/000453
§ 371 (c)(1),
(2), (4) Date: Aug. 4, 2010

(87) PCT Pub. No.: WO2009/112918
PCT Pub. Date: Sep. 17, 2009

(65) Prior Publication Data
US 2010/0322152 A1    Dec. 23, 2010

(30) Foreign Application Priority Data
Mar. 12, 2008    (EP) .................................... 08300140

(51) Int. Cl.
*H04W 4/00*    (2009.01)
(52) U.S. Cl.
USPC ............................ 370/204; 370/328; 370/206
(58) Field of Classification Search
USPC .................................. 370/204, 206; 714/752
See application file for complete search history.

(56) References Cited

U.S. PATENT DOCUMENTS

| | | | |
|---|---|---|---|
| 2001/0016008 A1 | 8/2001 | Bahl et al. | |
| 2001/0048481 A1* | 12/2001 | Hatano et al. | 348/473 |
| 2002/0109787 A1* | 8/2002 | Moni et al. | 348/616 |
| 2005/0105807 A1 | 5/2005 | Suino et al. | |
| 2006/0114987 A1 | 6/2006 | Roman | |
| 2006/0218249 A1 | 9/2006 | Nakase | |
| 2007/0002946 A1 | 1/2007 | Bouton et al. | |
| 2007/0047906 A1 | 3/2007 | Hagiwara et al. | |
| 2008/0037466 A1* | 2/2008 | Ngo et al. | 370/329 |
| 2008/0049141 A1* | 2/2008 | Fukui et al. | 348/565 |
| 2008/0059170 A1* | 3/2008 | Bloebaum et al. | 704/233 |
| 2008/0250294 A1* | 10/2008 | Ngo et al. | 714/752 |
| 2009/0148065 A1* | 6/2009 | Halsted | 382/284 |
| 2009/0217331 A1* | 8/2009 | Park et al. | 725/103 |

FOREIGN PATENT DOCUMENTS

| | | |
|---|---|---|
| EP | 1227684 | 7/2002 |
| EP | 1227684 A2 * | 7/2002 |
| EP | 1775946 | 4/2007 |
| JP | 2000115085 | 4/2000 |

(Continued)

OTHER PUBLICATIONS

Search Report dated Jul. 8, 2009.

(Continued)

*Primary Examiner* — Dang Ton
*Assistant Examiner* — Pamit Kaur
(74) *Attorney, Agent, or Firm* — Robert D. Shedd; Kuniyuki Akiyama (57) ABSTRACT

A wireless transmission scheme for transmitting images utilizing a cross layer method integrated the slice allocation and multiple modulation and coding modes selection without the need of feedback channel. The scheme divides a coded image into isolated coded slices, wherein each slice represents a region of the image and each slice is then modulated using modulation schemes of differing robustness. Data of most interest is received by all receivers, with some receivers receiving more data in areas with good channel conditions.

5 Claims, 6 Drawing Sheets (56) References Cited

FOREIGN PATENT DOCUMENTS

| JP | 2000347644 | 12/2000 |
|----|------------|---------|
| JP | 2004096309 | 3/2004 |
| JP | 2005094578 | 7/2005 |
| JP | 2006020128 | 1/2006 |
| WO | WO 2005/032035 | 4/2005 |

OTHER PUBLICATIONS

Jiang, Tao, et al, "Multicast broadcast services support in OFDMA-Based WiMAX systems [Advances in Mobile Multimedia]." Comrnunications Magazine, IEEE 45.8 (2007): 78-86.

Kuo, Wen-Hsing, et al,, "Utility-based resource allocation for layer-encoded IPTV multicast in IEEE 802.16 (WiMAX) wireless networks." Communications, 2007, ICC'07. IEEE International Conference on. IEEE, 2007.

Wang, Jianfeng, et al. "System architecture and cross-layer optimization of video broadcast over WiMAX." Selected Areas in Communications, IEEE Journal on 25.4 (2007): 712-721.

Huang, Chih-Wei, et al., "Congestion and error control for layered scalable video multicast over WiMAX," IEEE Mobile WiMAX Symposium, 2007. IEEE, iss. 25-29, pp. 114-119, Mar. 2007.

Retnasothie, Francis E., et al. "Wireless IPTV over WiMAX: challenges and applications." IEEE Wireless and Microwave Technology Conf, 2006. WAMICON'06. IEEE Annual iss. 4-5, pp. 1-5, IEEE, 2006.

Kim, Junu, et al., "Resource allocation for scalable video broadcast in wireless cellular networks." Wireless and Mobile Computing, Networking and Communications, 2005. (WiMob'2005), IEEE International Conf. vol. 2. Iss. 22-24, pp. 174-180, IEEE, Aug. 2005.

Song, Guocong, et al. "Asymptotic performance of broadcast services in IEEE 802.16 e with CSTD." Vehicular Technology Conference, 2006. VTC-2006 Fall. 2006 IEEE 64th. IEEE, 2006.

http://www.wimaxforum.org, Mobile WiMAX œPart 1: A Technical Overview and Performance Evaluation, white paper, Aug. 2006.

Hannuksela, Miska M., et al. "Isolated regions in video coding." Multimedia, IEEE Transactions on 6.2 (2004): 259-267.

CN Search Report for Corresponding CN Application CN200980108218.6 dated Jan. 6, 2013.

* cited by examiner

METHOD AND APPARATUS FOR TRANSMITTING AN IMAGE IN A WIRELESS NETWORK

This application claims the benefit, under 35 U.S.C. §365 of International Application PCT/IB2009/000453, filed 6 Mar. 2009, which was published in accordance with PCT Article 21(2) on 17 Sep. 2009, in English and claims priorty on EP application 08300140.4 filed 12 Mar. 2008.

BACKGROUND OF THE INVENTION

The present invention generally relates to communications systems. More particularly, the present invention relates to a wireless transmission scheme for transmitting images utilizing a cross layer method integrated the slice allocation and multiple modulation and coding modes selection without the need of feedback channel.

Multicast and broadcast services (MBS) such as mobile IPTV are regarded as important applications in WiMAX (Worldwide Interoperability for Microwave Access) networks. It is desirable in a wireless network to simultaneously transmit the same video content to a group of users to reduce bandwidth consumption compared with transmitting the content to each user individually. However, the wireless environment is known to be error-prone because of attenuation, shadowing, multipath fading, interference and mobility of terminals. As a result, the channel characteristics vary in time and location. Even under a connection-oriented network like WiMAX, the reliable transmission and QoS guarantee for MBS is still a challenging task. Compared to unicast service, one difficulty originating in MBS comes from the fact that the channel conditions between the BS(Base Station) and each of the MSs (Mobile Station) in a multicast group may differ and in the absence of feedback, which constrains the performance and deployment of mechanism relying on the channel estimation.

By Using Adaptive Modulation and Coding (AMC) scheme, a WiMAX system can choose a higher order modulation scheme or a lower order modulation scheme. In the area near to the BS when SNR (signal-to-noise ratio) is good, the system can use the higher order modulation scheme to maximize data transfer. In an area close to the cell boundary with poor SNR or in a mobile system subject to multipath or shadowing interference, the system may step down to a lower order modulation scheme to maintain the connection quality and link stability. However, AMC alone is only suitable for unicast service with dedicated feedback channel, there is no direct feedback channel defined for MBS. Thus, the operating condition of individual receivers is unknown to the BS and therefore adjustment on the source side during transmission are unavailable.

There are 3 conventional methods for the MBS in wireless transmission. Taking the coverage with high priority, the first approach chooses the most robust modulation for MBS in order to guarantee the reliable transmission in the whole cell. The disadvantage is the poor performance for spectrum efficiency and the total number of supporting services will be limited. The second trend is to deploy multiple bitstreams of the same source sequence, generated with different parameters set and rate, the receiver can switch from one of them to another based on the channel condition it detects. The shortcoming is the redundancy traffic introduced will cause bandwidth waste. The third one is selecting one group leader to report the channel quality through Channel Quality Information (CQI) channel to the BS as the basis of adjustment, the problem is the group leader can only represent the receivers near to itself, such setting heavily penalizes those terminals exhibiting better or worse channel conditions.

The WiMAX standard supports an adaptive modulation and coding (AMC) scheme that enables throughput optimization based on the propagation conditions. Under the same channel bandwidth, the higher order modulation can achieve higher data rate during transmission, but higher order modulation requires better channel conditions, so it has shorter reliable transmission distance than lower order modulation.

It would be desirable to provide different types of video quality in term of display region for the receivers located under different channel states inside the coverage of BS. A desirable solution to overcome the above stated problems would improve the transmission utility and spectrum efficiency for video MBS service in mobile WiMAX network without the need of feedback channel.

SUMMARY OF THE INVENTION

The present invention provides a mechanism that combines the technology of slice allocation/construction in application layer and modulation/coding selection in the physical layer for video MBS service in the mobile WiMAX network. A balance of the visual effect in the terminal and transmission efficiency in the system can be achieved. Even in the situation that feedback is absent, terminals in the area with different channel conditions can receive different quality of video in terms of display region.

In an exemplary embodiment, the present invention teaches a method of receiving an image comprising the steps of receiving a first data representing a first region of the image, wherein the first data is received at a higher order modulation scheme, receiving a second data representing a second region of said image, wherein the second data is received at a lower order modulation scheme. The exemplary method then discards the second data in response to a quality indicator of the second data being below a threshold or combines the first data and said second data to regenerate the image in response to a quality indicator being above said threshold.

In a further exemplary embodiment, the apparatus comprises a display device wherein the first data is displayed, wherein the first data represents a first region of the image, if the quality indicator of the second data is below a threshold. If the quality indicator of the second data is above the threshold, the device combines the first data and said second data to regenerate the image and then displays the image.

DETAILED DESCRIPTION

Other than the inventive concept, the elements shown in the figures are well known and will not be described in detail. Also, familiarity with television broadcasting and receivers is assumed and is not described in detail herein. For example, other than the inventive concept, familiarity with current and proposed recommendations for TV standards such as NTSC (National Television Systems Committee), PAL (Phase Alternation Lines), SECAM (SEquential Couleur Avec Memoire) and ATSC (Advanced Television Systems Committee) (ATSC) is assumed. Likewise, other than the inventive concept, transmission concepts such as WiMAX (Worldwide Interoperability for Microwave Access), eight-level vestigial sideband (8-VSB), Quadrature Amplitude Modulation (QAM), and receiver components such as a radio-frequency (RF) front-end, or receiver section, such as a low noise block, tuners, demodulators, correlators, leak integrators and squarers is assumed. Similarly, formatting and encoding methods (such as Moving Picture Expert Group (MPEG)-2 Systems Standard (ISO/IEC 13818-1)) for generating transport bit streams are well-known and not described herein. It should also be noted that the inventive concept may be implemented using conventional programming techniques, which, as such, will not be described herein. Finally, like-numbers on the figures represent similar elements.

The invention is proposed to improve the transmission utility and spectrum efficiency for video MBS service in mobile WiMAX network. A cross layer method integrated the slice allocation and multiple modulation and coding modes selection are deployed in the wireless environment without the need of feedback channel. One benefit of the present invention is to provide different types of video quality in term of display region for the receivers located under different channel states inside the coverage of BS.

Figure 1:
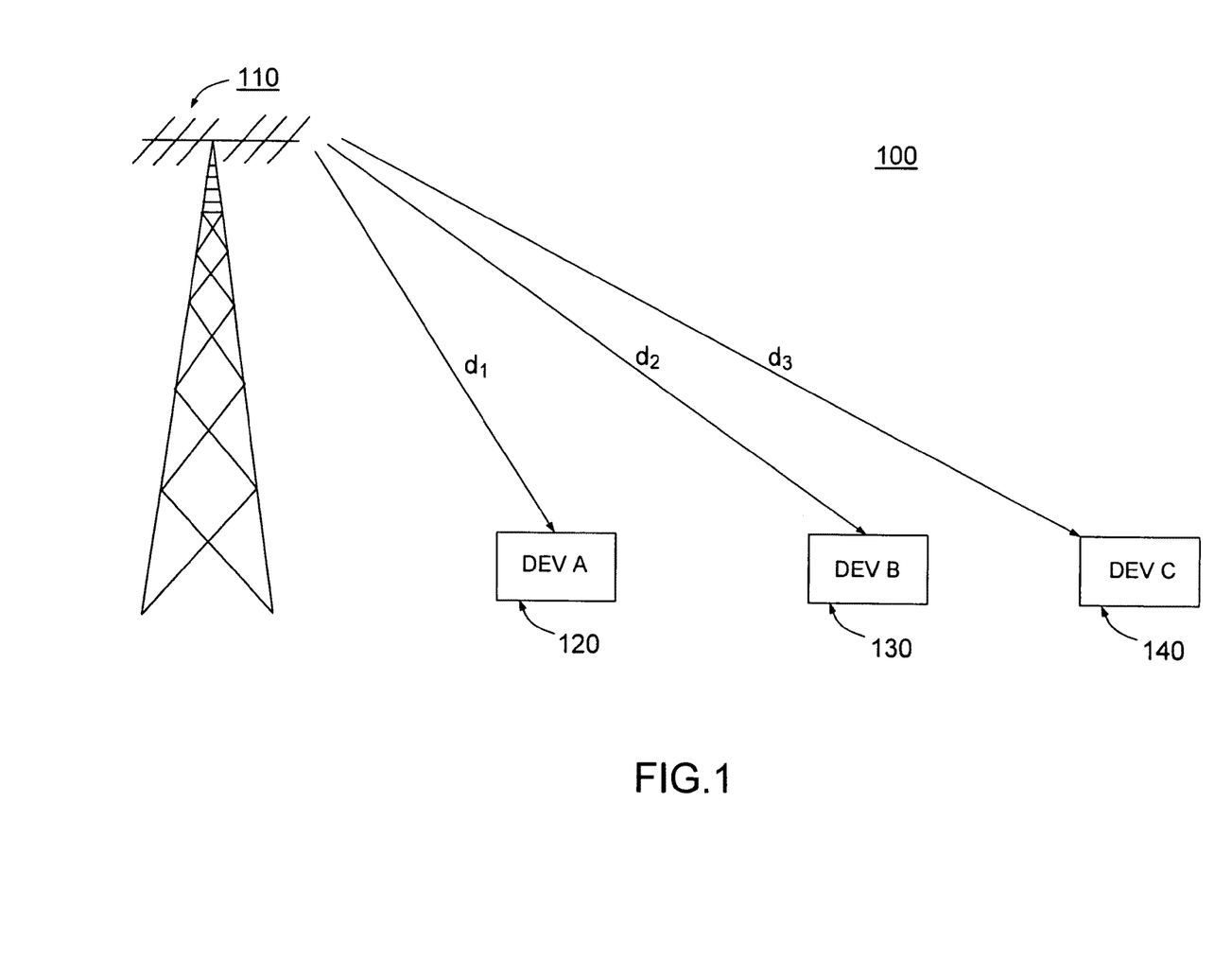
FIG. 1 illustrates an exemplary environment for transmission according to an exemplary embodiment of the present invention.

Turning now to FIG. 1, an exemplary environment for transmission (100) according to an exemplary embodiment of the present invention is shown. The environment for transmission (100) may comprise a base station, BS (110) or similar transmission point, a first device, DEVA (120) located at a first distance (d1) from the BS, a second device, DEVB (130) located a second distance (d2) from the BS, and a third device, DEVC (140) located a third distance from the BS.

The BS (110) is operative to receive an image from a processor and transmit the image to a plurality of devices (120, 130, 140) within the transmission radius of the BS (110). However, as the distance between the BS (110) and each device (120, 130, 140) varies, as does the propagation characteristics of the transmitted signal, as well as the physical characteristics of the device, the ability for a device to receive the transmitted signal at a certain bit rate, data rate, or compression scheme also varies.

To overcome the above stated undesirable conditions experienced with wireless transmission, the system according to the principles of the present invention is operative to divide a coding image into coded slices, wherein each slice represents a region of the image. The system them modulates each slice using a different modulation scheme such that some slices may be received by MSs located in the entire cell boundary and some slices may only be received by efficient MSs or MSs located in the area near the BS. The slices and modulation schemes are chosen such that areas of interest of the image are received by the maximum number of MSs and areas of the image that are not of interest are received by a lesser number of MSs. Thus, the system eliminates the waste of bandwidth associated with multicast transmission of the same content using different modulation schemes, provides more data to those MSs able to receive less robust modulated signals located in area with good channel conditions, and less data but still the data of interest, to those MSs only able to receive a more robustly modulated signal.

Figure 2:
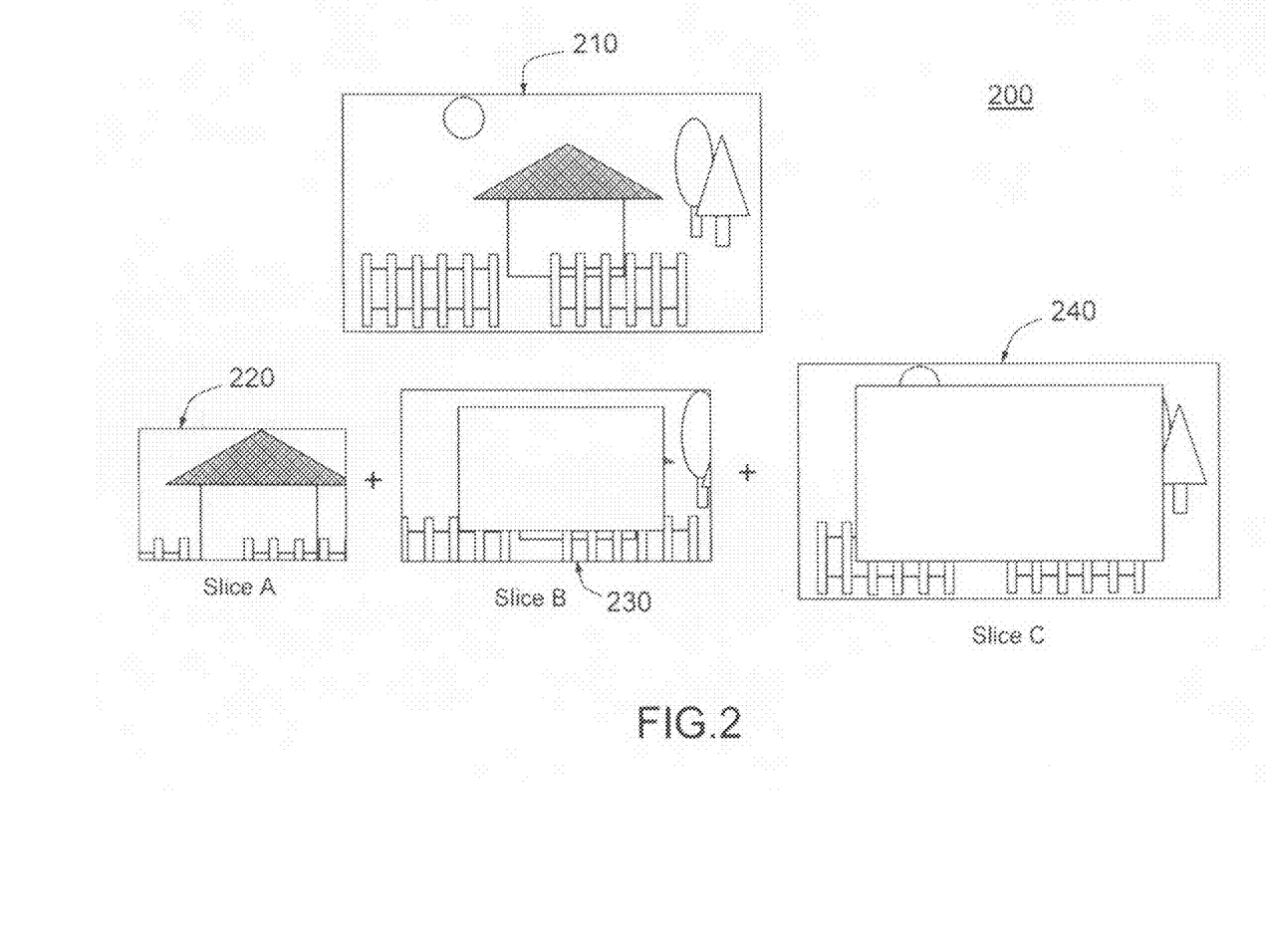
FIG. 2 shows an illustrative diagram of a rectangular slice allocation pattern embodying the principles of the invention.

Turning now to FIG. 2, an illustrative diagram of a rectangular slice allocation pattern (200) embodying the principles of the invention. Video coding standards like H.264/AVC allow dividing a coded picture to coded slices, which can be regarded as a way to split a coded picture to independently decodable pieces. Considering the watching behavior of human beings, people typically pay more attention to a particular area in an image or video frame than to other areas in the same frame. Additionally, typical picture composition places the focus on the central point in a picture. According to one exemplary embodiment of the present invention, the original image (210) is divided into 3 independent slices A (220), B (230), and C (240). The content in each slice can be coded and transmitted as an isolated stream at differing modulation schemes. The slices of the image deemed to be of greater interest to the user can be modulated using a more robust modulation scheme, thereby ensuring that the maximum number of MSs receiving the data of most interest. The slices deemed to be of less interest are modulated using a less robust modulation scheme. The slice pattern however is not limited to rectangular slices, and any number of slice patterns can be used, some of which are depicted in FIG. 3.

Figure 3:
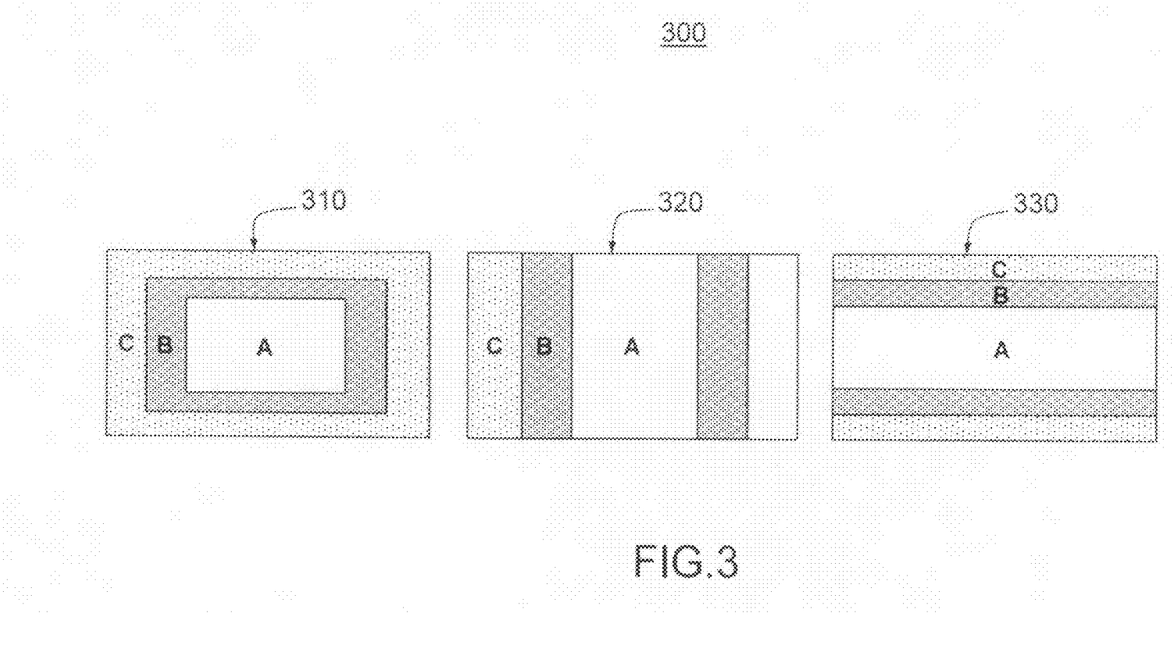
FIG. 3 shows an illustrative portion of slice allocation patterns embodying the principles of the invention.

Turning now to FIG. 3, an illustrative portion of slice allocation patterns (300) embodying the principles of the invention is shown. The patterns for slices, in static or flexible mode are unlimited and may vary according to image content or transmitter processing power. Pattern I (310) for example, may be suitable for all types of central focusing stream, pattern II (320) may be best suited for vertical partition matching the TV program such as fashion show. For sports program, horizon partition like pattern III (330) may be a better choice. The method to allocate isolated slices from a coded picture or frame is out of the scope of this disclosure, any available patterns can be the candidate. Additionally, the slice allocation pattern as well as the size of the slices themselves may change based on the image content. For example, the image processor may comprise an algorithm used to analyze the image and determine the areas of interest to the user. For example, in a video transmission, areas that are the most rapidly changing may indicate the areas of interest to the viewer. Thus, the slices are made with the first slice comprising the areas of highest interest, or movement, the second slice comprising the next highest areas of interest, and so on.

Thus according to an exemplary embodiment of the present invention, the proposed region based modulation mechanism combines slice allocation and modulation mode selection mentioned above. The priority of slice is defined in sequence as A>B>C, and each slice is corresponding with a modulation/coding mode separately. Possible deployment scenarios include, but are not limited to, QPSK, 16QAM, 64QAM etc.

Figure 4:
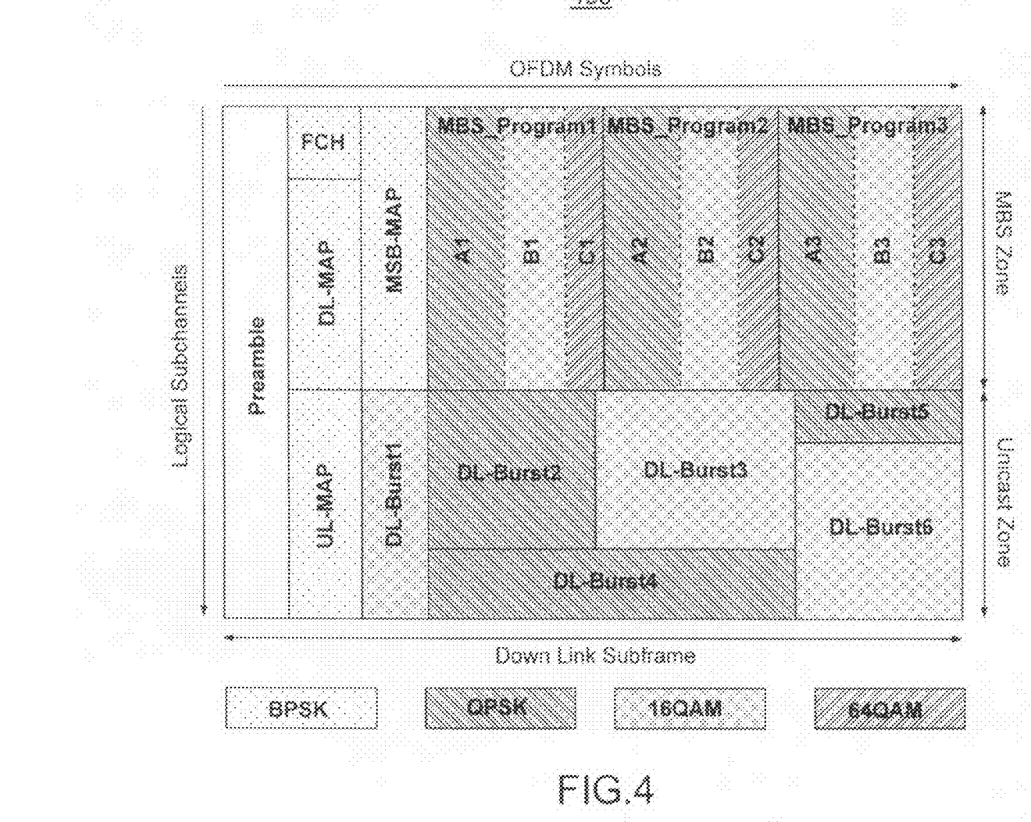
FIG. 4 shows an illustrative sample downlink subframe in a WiMAX OFDM physical frame in accordance with the principles of the invention.

Turning now to FIG. 4, an exemplary sample downlink subframe (400) in a WiMAX OFDM physical frame in accordance with the principles of the invention is shown. The physical OFDMA frame allocation can be implemented in the MBS data block inside the MBS zone. The information of the block size and modulation coding mode are encapsulated in the interval element (MBS-MAP). Isolated slices (A1, B1, C1) for MBS_Program1 are shown in the representation in a broadcast/multicast session. The same processing is employed for additional isolated slices (A2, B2, C2 and A3, B3, C3) in MBS_ Program 2 and MBS_ Program 3 respectively. According to this exemplary embodiment, each MBS program uses the same allocation strategy. This is not mandatory however and the BS can choose different allocation strategy based on the parameter of video traffic and the availability of free bandwidth.

From a receiver aspect, the centralized region (slice A) only may be displayed if the receiving device is located in the margin area of the cell and the other regions (Slice B and C), cannot be effectively decoded. In this situation, the other slices (Slice B and C) are discarded because of the transmission error or packet loss. The leftover region may be displayed as black background, or slice A may be stretched to cover a larger portion of the display area. Fore MSs within the middle distances, a larger frame with slice A+slice B may be composed. For the nearest MS close to BS, a full view of picture may be received as a result of better channel conditions and the MSs ability to receive slices using all modulation schemes. According to the exemplary embodiment of a sample deployment and visual effect as represented according to FIG. 4, inside each slice, the coding and transmission is independent, so the decoder based technology for error resistance like intra block refreshing, scalable video coding and error concealment can be deployed, furthermore, some mechanisms in transmission layer for error resistance like FEC(forward error correction) and ARQ (Automatic Repeat reQuest) can also be introduce for QoS enhancement.

Figure 5:
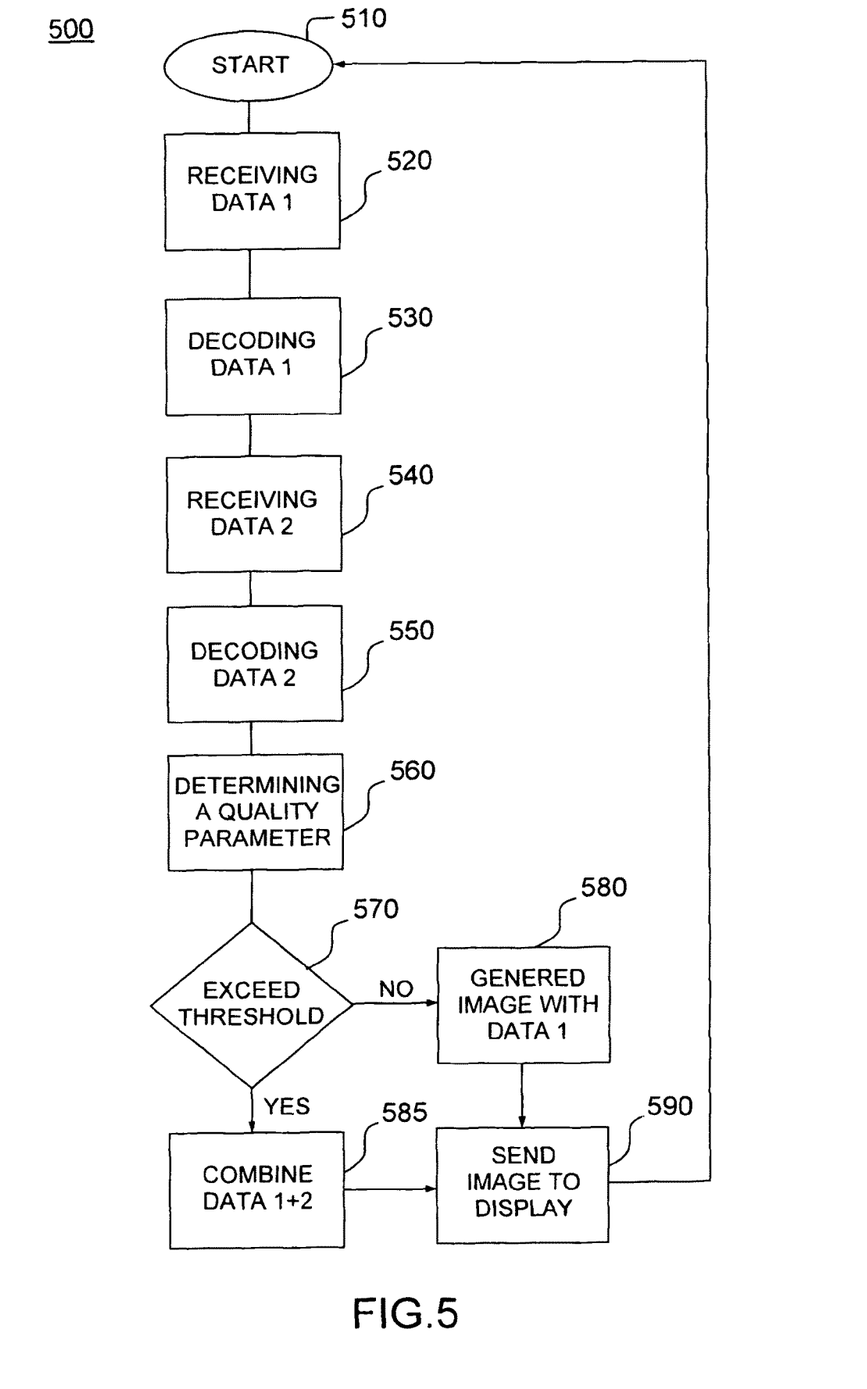
FIG. 5 shows an illustrative flow chart in accordance with the principles of the invention.

Turning now to FIG. 5, an illustrative flow chart (500) representing the reception process in accordance with the principles of the invention is shown. Initially (510) the apparatus waits for data to be received. Once data is received (520) the apparatus decodes data 1 (53) according to a first modulation scheme, for example the most robust modulation scheme being implemented. The apparatus then receives data 2 (540) and then decodes data 2 (550) according to as second modulation scheme, such as the lower robust modulation scheme being implemented. It should be noted that data 1 and data 2 may be received in the same physical frame by the receiver and subsequently separated into separate data files, with each data file representing a different image slice. The apparatus then measures the signal quality of data 2 (56) and compares this measured signal quality to a threshold (570). The threshold represents the minimum signal quality required for the data slice to be displayed. If the signal quality of data 2 exceeds the threshold, the apparatus combines data 1 and data 2 (585) such that data representing an image comprising the image slices represented by data 1 and data 2. If the signal quality of data 2 does no exceed the threshold, the apparatus generates data representing an image comprising the image slices represented by data 1 only (580). The data representing the image is then sent to a display device (590) and the apparatus returns to the start (510) to wait for the next data to be received.

Figure 6:
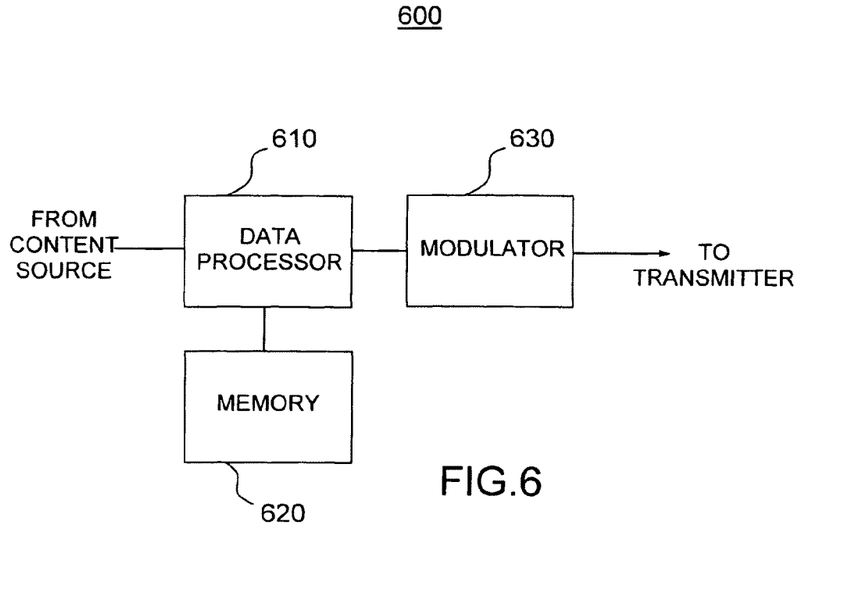
FIG. 6 shows an illustrative block diagram of an apparatus operative to modulate and prepare data for transmission on a wireless network according to an exemplary embodiment of the present invention.

Turning now to FIG. 6, a block diagram of an apparatus (600) operative to modulate and prepare data for transmission according an exemplary embodiment of the present invention is shown. The apparatus (600) includes a data processor (610), a modulator (630), a memory (620) and a connection to a content source and to a transmitter suitable for wireless transmission of the modulated data. The modulator (630) can be implemented in either software or hardware, or a combination thereof. The memory (620) is operative to store data and operating programs including programs previously described in exemplary embodiments according to the present invention.

Figure 7:
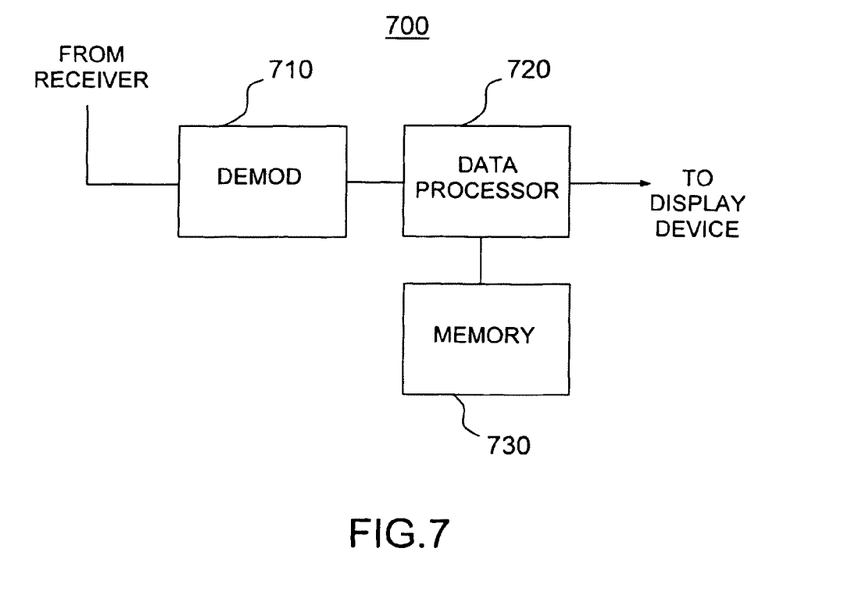
FIG. 7 shows an illustrative block diagram of an apparatus operative to demodulate and prepare data for display on a display device according to an exemplary embodiment of the present invention.

Turning now to FIG. 7, a block diagram of an apparatus (700) operative to demodulate and prepare data for display on a display device according to an exemplary embodiment of the present invention is shown. The apparatus (700) comprises a demodulator (710) a data processor (720), a memory (730) and a connection to a receiver suitable for receiving wireless transmission of modulated data. The demodulator (710) may be implemented in either hardware or software or a combination thereof. The memory (730) is operative to store data and operating programs including programs previously described in exemplary embodiments according to the present invention.

Benefits of the present invention over the current state of the art include that the number of slices in a frame and the size of each slice are determined by BS freely. Furthermore, all slices for a picture can be encapsulated in the same physical frame, thereby eliminating out-of-synchronization problems during the reconstruction of the decoded slices in the receiver. Another benefit for mobile WiMAX is the ability to support the mobility of terminal. For those moving terminals inside the coverage of a BS, at a minimum they should be able to receive the content displayed in the central slice and therefore be capable of displaying at least some content. For the situation of handover, the mechanism of macro diversity and paging groups defined in the IEEE802.16e standard can be deployed. Additionally, since the slice allocation pattern may be kept unchanged during the life cycle of a program, bandwidth use can be further minimized by eliminating the need to transmit duplicated information inside each frame (the minimal frame slot in WiMAX network is 5 ms), such notification of allocation pattern can be done in the first several frames or periodically during transmission.

As described above, and in accordance with the principles of the invention, a receiver determines equalizer lock as a function of the distribution of received signal points in a constellation space, wherein different weights are given to different regions of the constellation space. It should be noted that although the inventive concept was described in terms of a weight value of zero (i.e., no weight) being given to received signal points falling within an inner region and a weight value of one being given to received signal points falling in an outer region, the inventive concept is not so limited. Likewise, although the inventive concept was described in the context of an outer region and an inner region, the inventive concept is not so limited.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs). Similarly, although shown as separate elements, any or all of the elements of may be implemented in a stored-program-controlled processor, e.g., a digital signal processor, which executes associated software, e.g., corresponding to one or more of the steps shown in, e.g., FIGS. 5 and/or 6, etc. Further, although shown as elements bundled within TV set 10, the elements therein may be distributed in different units in any combination thereof. For example, receiver 15 of FIG. 3 may be a part of a device, or box, such as a set-top box that is physically separate from the device, or box, incorporating display 20, etc. Also, it should be noted that although described in the context of terrestrial broadcast, the principles of the invention are applicable to other types of communications systems, e.g., satellite, cable, etc. It is therefore to be understood that numerous modifications may be made to the illustrative embodiments and that other arrangements may be devised without departing from the spirit and scope of the present invention as defined by the appended claims.

The invention claimed is:

1. A method of receiving an image comprising the steps of:
receiving a first data representing a first region of said image, said first data comprising a first modulation scheme;
receiving a second data representing a second region of said image, said second data comprising a second modulation scheme, said first region and said second region being mutually exclusive without including an overlapping portion of said image in each other,
said first modulation scheme being more robust than said second modulation scheme,
said first region including a higher moving portion of said image than said second region; and
discarding said second data in response to a quality indicator of said second data being below a threshold and combining said first data and said second data in response to said quality indicator being above said threshold,
wherein said combining step further comprising the steps of:
demodulating said first data to generate a first demodulated signal representing said first region of said image;
demodulating said second data to generate a second demodulated signal representing said second region of said image; and
generating a combined demodulated signal suitable for coupling to a display device, said combined demodulated signal comprising said first region of said image and said second region of said image.

2. The method of claim 1 wherein said threshold represents a minimum signal quality required for said second data to be displayed.

3. The method of claim 1 wherein the first data and the second data are received in a single frame via a wireless transmission.

4. The method of claim 1 wherein the first data is transmitted at a first frequency and the second data is transmitted at a second frequency.

5. The method of claim 1 wherein the first data is modulated according to a first data rate and the second data is modulated according to a second data rate.

* * * * *